Figure 1:
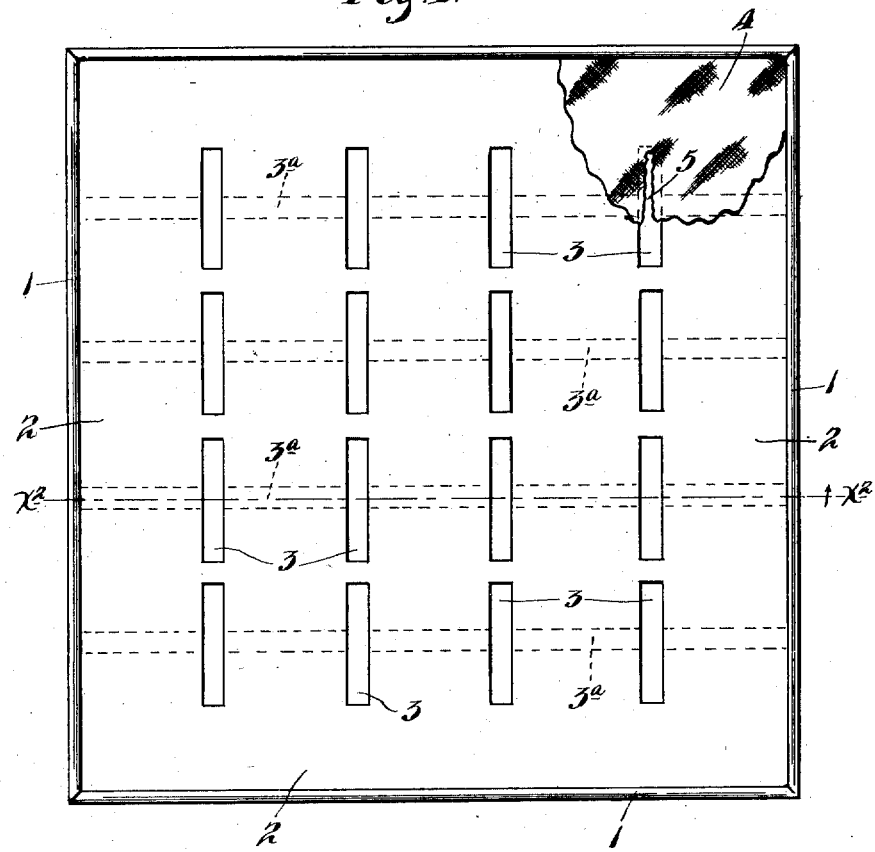

W. B. DAHL.
RING TRAY.
APPLICATION FILED NOV. 23, 1910.

989,571.

Patented Apr. 18, 1911.

3 SHEETS—SHEET 1.

Witnesses.
Harry Opsahl.
E. C. Skinkle.

Inventor:
Walter B. Dahl.
By his Attorneys.
Williamson & Merchant

W. B. DAHL.
RING TRAY.
APPLICATION FILED NOV. 23, 1910.

989,571.

Patented Apr. 18, 1911.
3 SHEETS—SHEET 2.

Witnesses.
Harry Opsahl.
E. C. Skinkle.

Inventor:
Walter B. Dahl.
By his Attorneys,
Williamson & Merchant

W. B. DAHL.
RING TRAY.
APPLICATION FILED NOV. 23, 1910.

989,571.

Patented Apr. 18, 1911.
3 SHEETS—SHEET 3.

Witnesses.
Harry Opsahl.
E. E. Skinkle.

Inventor.
Walter B. Dahl.
By his Attorneys.
Williamson Merchant

UNITED STATES PATENT OFFICE.

WALTER B. DAHL, OF MINNEAPOLIS, MINNESOTA.

RING-TRAY.

989,571.  Specification of Letters Patent.  Patented Apr. 18, 1911.

Application filed November 23, 1910. Serial No. 593,782.

*To all whom it may concern:*

Be it known that I, WALTER B. DAHL, a citizen of the United States, residing at Minneapolis, in the county of Hennepin and State of Minnesota, have invented certain new and useful Improvements in Ring-Trays; and I do hereby declare the following to be a full, clear, and exact description of the invention, such as will enable others skilled in the art to which it appertains to make and use the same.

My invention has for its especial object to provide an improved ring tray and, to this end, the invention consists of the novel devices and combinations of devices hereinafter described and defined in the claims.

In displaying rings for sale in retail stores, the rings are usually held in trays from which any number or all of the rings may be removed at one time and from these trays, from time to time, rings will disappear through dishonest manipulation of purchasers. To avoid such loss of the rings requires the closest attention of the salesman at times when his attention might well be divided between a number of purchasers. Even with the most careful attention, skilful manipulators will frequently manage to slip away with one or several of the rings.

My improved ring tray will exhibit in the tray all of the rings contained therein and will permit the removal from the tray of any of the rings, one at a time, but will require the removed ring to be replaced before another ring may be removed. With such a device, the salesman can safely leave the tray with the prospective purchasers for examination while he waits on other customers or attends to other work, inasmuch as it is an easy matter to keep track of the one ring removed from the tray.

The term "tray" is used in a very broad sense, so it will cover a device adapted to hold a multiplicity of rings, but, preferably, the rings are arranged in a plurality of rows in the tray and the mechanism is arranged so that when one ring is removed from one row, no other ring can be removed from any of the rows until the first removed ring has been replaced.

A ring tray embodying the several features of my invention is illustrated in the accompanying drawings, wherein like characters indicate like parts throughout the several views.

Figure 2:
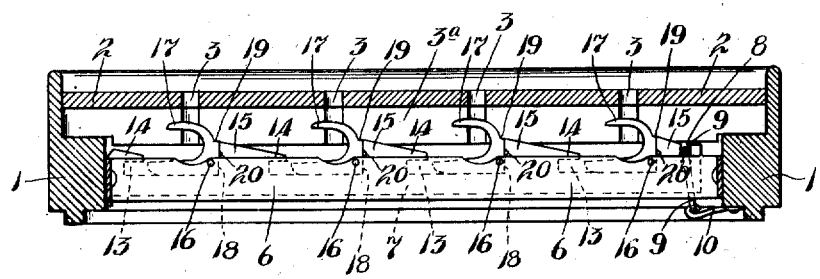
Figure 3:
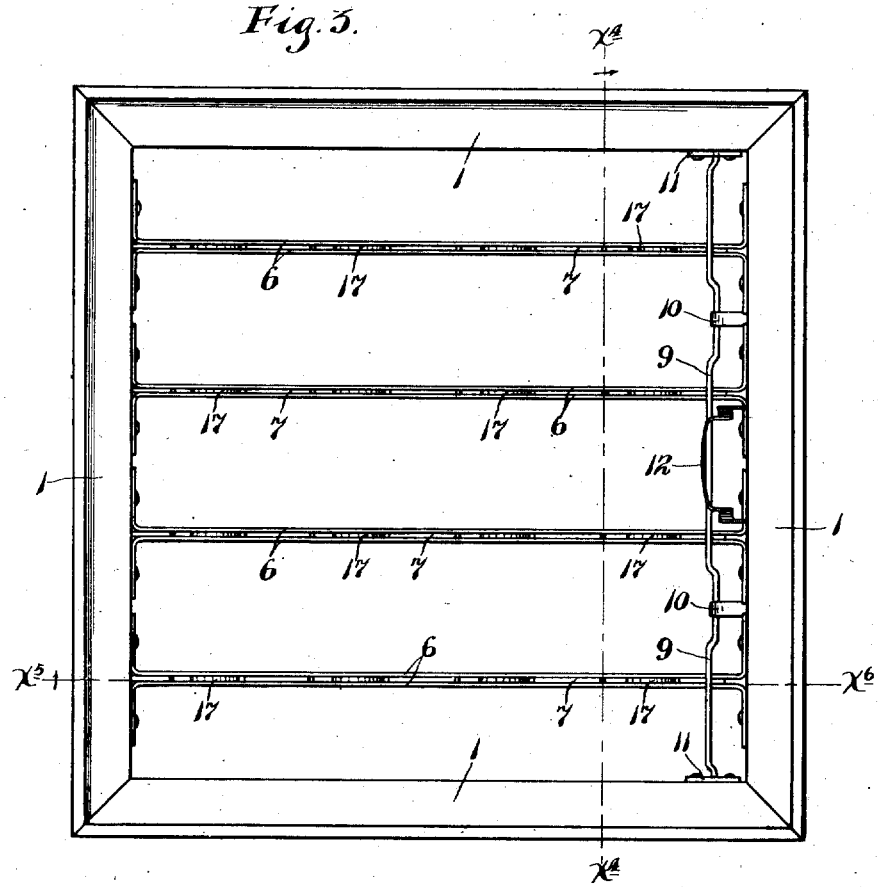
Figure 4:
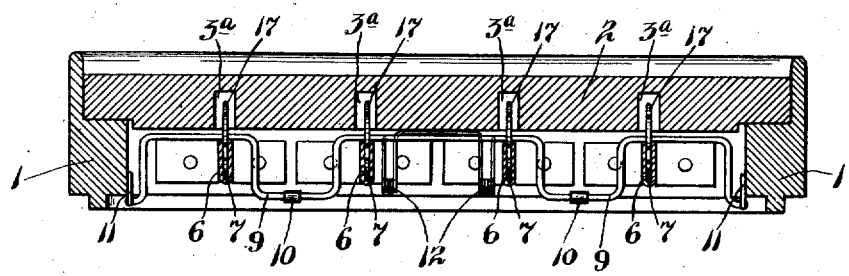
Figure 5:
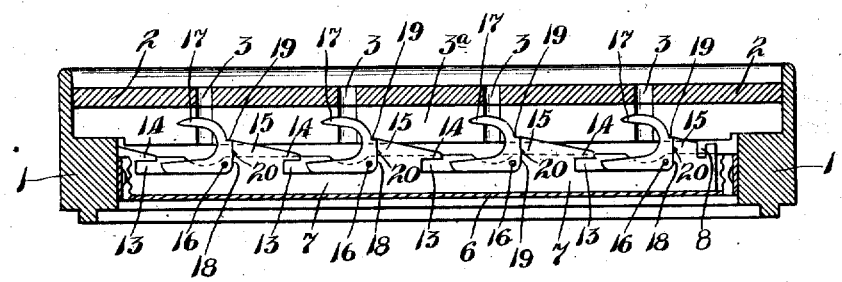
Figure 6:
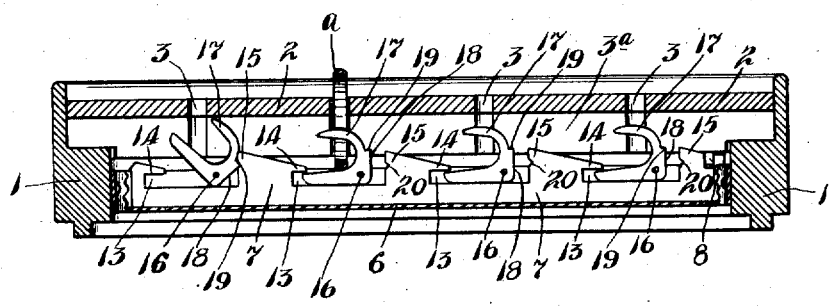

Referring to the drawings, Figure 1 is a plan view with some parts broken away, showing the improved tray; Fig. 2 is a transverse vertical section taken on the line $x^2 \ x^2$ of Fig. 1; Fig. 3 is a plan view of the tray with the top plate thereof removed; Fig. 4 is a transverse vertical section taken through the complete tray on the line $x^4 \ x^4$ of Fig. 3; and Figs. 5 and 6 are transverse vertical sections taken through the complete tray approximately on the line $x^5 \ x^6$ of Fig. 3, but illustrating different positions of the parts.

The body of the tray is made up of a rectangular marginal frame 1 and a top plate 2, which latter is provided with a plurality of rows of elongated perforations or slots 3 affording ring seats. Preferably, the top plate 2 is covered with felt, velvet or similar material 4, which has slots 5 overlying the slots 3 but of less width, it being, of course, understood that the cloth surrounding the slots 5 will be flexible so as to closely engage rings of different size and width.

Extending transversely of and below each row of ring seats 3 and rigidly secured at their ends to the marginal frame 1 are inverted U-shaped bars 6. Mounted for limited sliding movements in each U-shaped or channel bar 6 is a lock bar 7. At one end, the several lock bars 7 are shown as provided with notches 8 that are engaged by the bail-like portions of a crank shaft 9 mounted in suitable bearings 10 and 11 on one side of the marginal frame 1. A spring 12 attached at one end at the same side of the frame 1 presses inward on the upper bail-like portion of the crank shaft 9 and yieldingly holds all of the lock bars 7 pressed in normal positions toward the right in respect to Figs. 1, 2, 3, 5 and 6. In the said views 5 and 6, the crank shaft and spring are removed, but they are clearly shown in Figs. 2, 3 and 4.

Immediately under each ring seat 3, the underlying lock bar 7 is provided with a hook seat 13, a hook locking lug or projection 14 and an abutment 15. Working loosely within each seat 13 and pivoted at 16 to the sides of the corresponding channel bar 6, is an approximately C-shaped ring locking hook 17, the lower prong of which is nearly straight. Normally, the lower arms of the several lock hooks 17 are free from the lock lugs 14 on the lock bars 7, and the abutments 15 engage flat back surfaces 18 of the hooks 17 and hold the same in normal positions with their upper prongs projecting through the rings and across or through the ring seats 3. One ring *a* is indicated as thus held in Fig. 6, and it will be noted that the top plate 2 in its under surface is provided with grooves 3ª that transversely intersect the lower portions of the ring seats 3 and in which the upper prongs of the ring hooks 17 are arranged to work with ample clearance to avoid friction. This normal position of the parts is best shown in Figs. 2 and 5, and in such normal position of the hooks, any ring may be pulled out of its seat, but under the action of pulling the ring out of its seat, it operates on the upper portion of the ring hook 17 and locks the same approximately into the position shown at the extreme left in Fig. 6, and such movement of this one ring hook forces the coöperating lock bar 7 toward the right, as shown in Fig. 6, and moves the lock lugs 14 of the said lock bar over the free ends of the lower arms of all of the other lock hooks, thereby locking such lock hooks in their normal positions with the rings locked in the coöperating seats. Furthermore, such movement of the one lock bar 7 imparts, through the crank shaft 9, similar movements to all of the several lock bars and simultaneously locks all of the lock hooks thereof in their normal positions. Hence, when one lock hook has been tilted into the position shown in Fig. 6, by the removal of a ring, all the other rings are locked in the tray.

To prevent the spring 12 from forcing the lock bars back to their normal positions, as soon as the removed ring has been drawn upward out of engagement with the upper prong of the coöperating lock hook 17, each lock hook is provided on its back edge, at the upper extremity of its flat surface 18, with the retaining lock shoulder 19 which is adapted to be engaged with a coöperating retaining notch 20 in the corresponding abutment 15. In fact, the said shoulders 19 and notches 20 are so arranged that their engagement will be only partly completed by drawing the ring out of the tray, so that they will coöperate under the pressure of the spring 12, to throw the lock hook into a position in which its upper prong will be drawn slightly to the right with the coöperating ring seat, as shown at the extreme left in Fig. 6. This action retracts the upper prong of the lock hook, so that it cannot be engaged by a downward movement of the ring, but on the contrary, the ring will first engage the lower portion of the said hook and force the same back into normal position after its lower portion has passed below the upper prong of the said hook. This insures the proper reëngagement of the lock hook with the ring. Obviously, when the tilted hook has been returned to its normal position by replacing the ring therein, the spring 12 will throw all the lock bars back to their normal positions so that any one of the rings may then be removed from the tray.

This improved ring holding device is herein, for convenience, designated as a ring tray, but it will, of course, be understood that the same may be used for holding various other articles than rings but which articles may have eyes or similar projections adapted for application to the lock hooks.

What I claim is:

1. A ring holding device having ring holding elements and coöperating lock mechanism therefor permitting the rings to be removed one at a time, but preventing the removal of a ring until the removed ring has been replaced.

2. A ring holding device provided with ring engaging elements and coöperating lock bars for said ring engaging elements, said bar having interlocking engagement with said ring engaging elements to lock in normal or operative positions all thereof except the first one thereof moved into releasing position.

3. A ring holding device provided with a plurality of ring seats, ring engaging lock hooks coöperating with said seats to hold rings therein, and spring pressed lock bars coöperating with said lock hooks and provided with lock lugs and abutments, the said hooks being operative on the said abutments when moved into releasing position to force said bars into positions in which their lock lugs lock all of the other hooks in normal or operative positions.

4. A ring holding device having a plurality of rows of ring seats, ring engaging lock hooks coöperating with said seats, a spring pressed lock bar coöperating with each row of lock hooks, and means connecting said lock bars for simultaneous movements, the said lock bars having abutments and lock lugs, and which hooks are operative on said abutments when moved into releasing positions, to force said bars into positions in which their lock lugs lock all of the other hooks in normal or operative positions.

5. A ring holding device provided with a plurality of ring seats, ring engaging lock hooks coöperating with said seats to hold rings therein, spring-pressed lock bars coöperating with said lock hooks and provided with lock lugs and abutments, the said hooks being operative on the said abutments when moved into releasing position to force said bars into positions in which their lock lugs lock all of the other hooks in normal or operative positions, and means for yieldingly holding any hook moved into a releasing position in such releasing position until forced back to normal position by replacing the removed ring.

6. A ring holding device provided with a plurality of ring seats, ring engaging lock hooks coöperating with said seats to hold rings therein, spring pressed lock bars coöperating with said lock hooks and provided with lock lugs and abutments, the said hooks being operative on the said abutments when moved into releasing position to force said bars into positions in which their lock lugs lock all of the other hooks in normal or operative positions, and the said lock hooks and abutments having coöperating retaining shoulders and notches serving to yieldingly hold in their releasing position a hook forced into such position, until returned to normal position by replacing the removed ring.

7. A ring holding device provided with a plurality of ring seats and coöperating pivoted approximately C-shaped ring engaging lock hooks, in combination with a spring pressed lock bar having abutments and lock lugs coöperating with said lock hooks, the said abutments being normally engageable with back surfaces of said hooks to yieldingly hold the same in normal positions but released from said lock lugs, the said hooks being operative on said abutments when moved into a releasing position, to force said lock bar into a position in which its lock lugs will engage and hold in normal positions the lower arms of all other lock hooks, substantially as described.

8. A ring holding device provided with a plurality of ring seats and coöperating pivoted approximately C-shaped ring engaging lock hooks, in combination with a spring pressed lock bar having abutments and lock lugs coöperating with said lock hooks, the said abutments being normally engageable with back surfaces of said hooks to yieldingly hold the same in normal positions but released from said lock lugs, the said hooks being operative on said abutments when moved into a releasing position, to force said lock bar into a position in which its lock lugs will engage and hold in normal positions the lower arms of all other lock hooks, and the said abutments and lock hooks having coöperating retaining shoulders and notches serving to yieldingly hold in a releasing position any lock hook moved into such position, substantially as described.

In testimony whereof I affix my signature in presence of two witnesses.

WALTER B. DAHL.

Witnesses:
ALICE V. SWANSON,
HARRY D. KILGORE.

---

Copies of this patent may be obtained for five cents each, by addressing the "Commissioner of Patents, Washington, D. C."